`3,025,174`
Patented Mar. 13, 1962

3,025,174
GLASS FOR MAKING ELECTRODES FOR
DETERMINING pH-VALUES
Wilhelm Simon, Zurich, Switzerland, assignor to
Ciba Limited, Basel, Switzerland
No Drawing. Filed Oct. 15, 1959, Ser. No. 846,556
Claims priority, application Switzerland Nov. 4, 1958
3 Claims. (Cl. 106—52)

This invention relates to the production of types of glass that are suitable for use in making the active part of a glass electrode used for determining pH-values.

The active part of a glass electrode used for determining pH-values is formed of a glass membrane composed of a glass that generally consists principally of silicon dioxide, sodium oxide and calcium oxide. Types of glasses have also been proposed in which sodium oxide is replaced by another alkali metal oxide, for example, lithium oxide or caesium oxide or a mixture of alkali metal oxides, and the calcium oxide is replaced by another alkaline earth metal oxide, more especially barium oxide, or a mixture of alkaline earth metal oxides, in order to improve the electromotive properties of the glass. The active part of the glass electrode, which is usually a thin membrane, is fused to a shaft of glass that has substantially no electromotive activity. It has been found that with the aforesaid types of glasses, which are selected primarily in view of the electromotive properties of the glass, certain manufacturing difficulties arise. Thus, there is a tendency for the product to devitrify, that is to say, to recrystallise. The capacity of such glass for being blown is also often poor. Furthermore, these glasses are usually difficult to fuse with the glass normally used for electrode shafts.

The present invention provides as a glass for the production of electrodes used for determining pH-values a glass containing a small proportion of germanium dioxide.

As stated above the glasses used for making electrodes, that is to say, for making electromotively active membranes, consist mainly of silicon dioxide, and the remainder consists mainly of alkali metal oxides and alkaline earth metal oxides.

There is advantageously used for making electrodes in accordance with this invention a glass of known composition, except that a very small proportion of the silicon dioxide is replaced by germanium dioxide. The proportion of the germanium dioxide is generally a few percent and does not exceed about 10%.

As will be seen from the examples given below, it has been found that the new type of glass provided by this invention, while it has the same properties as the known glasses, especially the same electromotive properties, has considerably more favourable properties for making glass electrodes than the original glass compositions. In general the use of the glasses of this invention for making electrodes reduces or eliminates the formation of bubbles and striae that very often occur and the glass flow is more suitable for blowing the glass to form a thin membrane. The tendency for devitrification (recrystallisation) to occur is also reduced. Especially advantageous, however, is the good adhesion of the glass to the glasses of which the shafts are made.

In the following description are given examples of the manufacture of the glass and measurements and evaluations of glass so made, the proportions of the components being given in mols percent.

An electrically heated furnace is used for heating the glass. The melting chamber measuring 200 mm. in depth, 130 mm. in breadth and 100 mm. in height was made of insulating bricks having a silicon dioxide-sintered alumina composition, and the chamber was heated by means of nine Silibor elements arranged on the side walls and cover of the chamber. These elements were supplied by means of a 3-phase transformer through a 3-phase sequence switch in such manner that the voltage could be adjusted in 12 stages between 45 and 100 volts. The measurement and control of temperature were carried out by means of a platinum/platinum-rhodium thermocouple inserted in the melting chamber and a hoop-drop relay. As setting member there is used a relay switch arranged on the primary side of the transformer.

The proportions of the finely pulverised starting materials corresponding to the theoretical composition of the glass were intimately mixed together, placed in a platinum crucible and the crucible was inserted in the melting furnace. The furnace temperature was raised until the whole mixture was completely melted. This normally took about 1–2 hours at a temperature of about 1200° C. The temperature was then raised to about 1350° C. The melt was maintained at that temperature until free from bubbles. The crucible was occasionally withdrawn for a short time from the furnace, in order to stir the melt by means of a platinum rod. After this refining treatment lasting about 1–2 hours, the melt was rapidly cooled by pouring it on to a slightly inclined aluminum plate provided with grooves and heated to about 20° C. In this manner small glass rods suitable for the further treatment were obtained. The quantity of glass produced per melt amounted to about 10–20 grams.

From the glass so prepared spherical electrodes were blown having a membrane diameter of about 9 millimeters and a thickness of membrane of the order of 0.1 millimeter. With these membranes the measurements were carried out at a temperature of $25.0°$ C.$\pm 0.1°$ C., the electrodes having been swollen at room temperature for 2 weeks in distilled water before measurement.

*Example 1*

As a control glass for the purpose of comparison there was used a glass described by G. A. Perley in Zeitschrift "Anal. Chem.," vol. 21, 1949, page 394, which consisted of 67.0% $SiO_2$, 25% $Li_2O$ and 8% $BaO$. In the manner described above two types of glass in accordance with the invention were melted, which glasses differed from the control glass only in that 1% and 4% respectively, of the content of silicon dioxide had been replaced by germanium dioxide. The membrane resistance $M\Omega$ and the deviation from the ideal electrode function in pH-units at 0.1 N-caustic soda and 1.0 N-caustic soda were measured.

| | Content of $GeO_2$ | | |
|---|---|---|---|
| | 4% | 1% | 0% |
| Membrane resistance ($M\Omega$) | 90 | 59 | 149 |
| Deviation from the ideal electrode function in pH-units: | | | |
| 0.1 n-NaOH (pH=12.88) | 0.10 | 0.11 | 0.10 |
| 1.0 n-NaOH (pH=13.83) | 0.44 | 0.45 | 0.37 |

This shows that with these glasses the alkali error was not or only very slightly worsened by the addition of germanium dioxide, and that the specific resistance was probably lower.

In evaluating the new glasses with regard to their working up properties it was found that they had a good workability coupled with the practically complete absence of bubble formation and also a good adhesion to the glass of the shaft. The adhesion of the glass having the higher content of germanium dioxide was about the same as that of the glass containing only 1% of germanium dioxide, but the glass having the higher content of germanium dioxide was somewhat more thinly liquid. The control glass was rated as having only a medium degree of adhesion.

*Example 2*

As a control glass there was used a glass also described in the literature referred to above, which consisted of 63.0% $SiO_2$, 3% $La_2O_3$, 25% $Li_2O$, 2% $Cs_2O$, 2% $CaO$ and 5% $BaO$. The content of the silicon dioxide was lowered to 59.0% and 4.0% of germanium dioxide were added. The electrical values measured for two glasses in the manner described in Example 1 were as follows:

|  | Content of $GeO_2$ | |
|---|---|---|
|  | 4% | 0% |
| Membrane resistance (MΩ) | 386 | 433 |
| Deviation from the ideal electrode function in pH-units: | | |
| 0.1 n-NaOH (pH=12.88) | 0.27 | 0.15 |
| 1.0 n-NaOH (pH=13.83) | 0.38 | 0.26 |

In the case of the glass containing germanium dioxide the resistance is practically the same, and the alkali error increased but remained within acceptable limits. In determining the workability of the glasses, that of the glass containing germanium dioxide was excellent. The glass exhibited no bubble formation, and possessed a flow suitable for working up and a very good adhesion to the shaft glasses. The control glass was thinly liquid and had a tendency to form bubbles, and its adhesion when fused to shaft glasses was poor.

What is claimed is:

1. Glass which consists essentially of 63% $SiO_2$, 25% $Li_2O$, 8% $BaO$ and 4% $GeO_2$.

2. Glass which consists essentially of 66% $SiO_2$, 25% $Li_2O$, 8% $BaO$ and 1% $GeO_2$.

3. Glass which consists essentially of 59% $SiO_2$, 3% $La_2O_3$, 25% $Li_2O$, 2% $Cs_2O$, 2% $CaO$, 5% $BaO$ and 4% $Ge_2O$.

References Cited in the file of this patent

UNITED STATES PATENTS 2,739,901     Herold et al.     Mar. 27, 1956
2,763,559     Weissenberg et al.     Sept. 18, 1956

OTHER REFERENCES

Eisenman et al.: "Science," vol. 126, October 25, 1957, pages 831–833.

UNITED STATES PATENT OFFICE
CERTIFICATE OF CORRECTION

Patent No. 3,025,174            March 13, 1962

Wilhelm Simon

It is hereby certified that error appears in the above numbered patent requiring correction and that the said Letters Patent should read as corrected below.

Column 2, line 49, for "membrance" read -- membrane --; column 4, line 16, for "$Ge_2O$" read -- $GeO_2$ --.

Signed and sealed this 23rd day of October 1962.

(SEAL)
Attest:

ERNEST W. SWIDER
Attesting Officer

DAVID L. LADD
Commissioner of Patents